United States Patent
Anders et al.

(10) Patent No.: US 6,833,193 B2
(45) Date of Patent: Dec. 21, 2004

(54) POLYCARBONATE MOLDED BODIES WITH IMPROVED OPTICAL PROPERTIES

(75) Inventors: Siegfried Anders, Köln (DE); Jürgen Röhner, Köln (DE); Wilfried Haese, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/220,770

(22) PCT Filed: Feb. 23, 2001

(86) PCT No.: PCT/EP01/02043
§ 371 (c)(1),
(2), (4) Date: Sep. 5, 2002

(87) PCT Pub. No.: WO01/66615
PCT Pub. Date: Sep. 13, 2001

(65) Prior Publication Data
US 2003/0064226 A1 Apr. 3, 2003

(30) Foreign Application Priority Data
Mar. 8, 2000 (DE) .......................... 100 11 278

(51) Int. Cl.$^7$ .............................. B32B 27/36
(52) U.S. Cl. .................... 428/412; 264/176.1; 264/219; 359/642; 428/411.1; 528/196; 528/198
(58) Field of Search .............................. 264/176.1, 219; 359/642; 528/196, 198; 428/411.1, 412

(56) References Cited

U.S. PATENT DOCUMENTS

| 4,436,879 A | | 3/1984 | Miller et al. ................. 525/439 |
| 5,856,012 A | * | 1/1999 | Kuhling et al. .............. 428/412 |
| 2003/0194561 A1 | * | 10/2003 | Bier et al. ................... 428/413 |

FOREIGN PATENT DOCUMENTS

| EP | 0 275 252 | 4/1990 |
| EP | 0 649 724 | 4/1995 |

* cited by examiner

Primary Examiner—Terressa Boykin
(74) Attorney, Agent, or Firm—Joseph C. Gil; Aron Preis

(57) ABSTRACT

A polycarbonate molding having improved optical properties is disclosed. The molding features an angle of deflection $\alpha_\epsilon$ (min) determined in a accordance with DIN 52305-A-AS of $\leq 2.0$ and a refractive index $D_\epsilon$ (min) determined in accordance with DIN 52305-A-AZ of $\leq 0.05$. The molding is prepared from a molding composition that contains a branched polycarbonate having a weight average molecular weight of 25,000 to 40,000 and melt volume rate of 2 to 20 cm$^3$/10 min (300° C.; 1.2 kg) determined in accordance with ISO 1133.

9 Claims, 1 Drawing Sheet

Makrolon KU 1 - 1243

Makrolon 3103

POLYCARBONATE MOLDED BODIES WITH IMPROVED OPTICAL PROPERTIES

This invention relates to polycarbonate mouldings having improved optical properties.

Polycarbonate mouldings, in particular polycarbonate solid sheets, are produced by extrusion or by injection moulding. Larger mouldings, such as large areas of glazing for motor vehicles, have to be produced by extrusion, because production by injection moulding can be carried out only under high pressures or mould-locking pressures which are not economically justifiable.

For the extrusion process, a polycarbonate granular material is fed into the extruder and melted in the plasticising system of the extruder. The plastics melt is pressed through a slot die, brought into the required shape in the roll nip of a glazing calender and set by alternate cooling on smoothing rolls and in the ambient atmosphere. The polycarbonates having a high melting viscosity which are used for the extrusion are conventionally processed at melting temperatures of 260 to 300° C.; the cylinder temperatures of the plasticising cylinder and the die temperatures are adjusted appropriately.

The surfaces of the sheet produced as a result of this process are not completely flat and exhibit irregularities. These give rise to optical distortions. Such optical distortions are undesirable for various applications, for example, glazing in motor vehicles, for which reason a number of measures for improving the optical properties of extruded polycarbonate mouldings been already been proposed in the past.

To decrease reflections and optical interference in the case of structured, weather-resistant sheets, EP 0 275 252 A proposes a polycarbonate laminated panel, to the surface of which is applied a protective coating which contains a methacrylate copolymer.

EP 0 114 290 A describes thermoplastic copolyester carbonate moulding compositions containing 1 to 15 wt. % of a branched polycarbonate and 15 to 99 wt. % of a copolyester carbonate resin. The processing properties and the resistance to hydrolysis as well as the impact strength are said to be improved by this mixture. It is found that the optical transparency of the polymer is not fundamentally impaired by the use of this moulding composition.

The object of the invention is to provide transparent polycarbonate solid sheets produced by extrusion and having optical properties improved to the extent that they permit use in motor vehicles.

Figure 1:
FIG. 1 shows a solid sheet obtained according to the invention in an oblique projection in accordance with DIN 52305.

Surprisingly, it has been found that this object is achieved by extrusion of polycarbonate moulding compositions which contain branched polycarbonates having a molecular weight $\overline{M}_w$ of 25,000 to 40,000, preferably of 28,000 to 36,000, and which have a melt volume rate (MVR) in accordance with ISO 1133 of 2 to 20 cm$^3$/10 min (300° C., 1.2 kg). A highly stable melt can be achieved by the use of such a moulding composition. The hitherto usual optical distortions of the sheet, which are caused by the varying forces acting at the upper side and under side of the extruded sheets can thereby be avoided.

The extruded polycarbonate solid sheets according to the invention, which are obtainable from the moulding composition described above, have an angle of deflection $\alpha_\epsilon$ (min) in accordance with DIN 52305-A-AS of $\leq 2.0$, preferably $\leq 1.5$, and a refractive index $D_\epsilon$ (min) in accordance with DIN 52305-A-AZ of $\leq 0.05$, preferably $\leq 0.03$.

It has been discovered that the angle of deflection $\alpha_\epsilon$ can be decreased by 40%, and the refractive index $D_\epsilon$ by 70%, as compared with sheets obtained in the conventional manner.

As a result of these improved optical properties, it is possible to use the sheets according to the invention as glazing for motor vehicles.

Suitable branched polycarbonates according to the invention can be produced by known processes. Suitable processes for the production of polycarbonates are, for example, the production from bisphenols and phosgene by the phase interface process or from bisphenols and phosgene by the process in homogeneous phase, the so-called pyridine process, or from bisphenols and carboxylic esters by the melt esterification process. The production processes are described, for example, in: H. Schnell, "Chemistry and Physics of Polycarbonates", Polymer Reviews, Volume 9, pages 31–76, Interscience Publishers, New York, London, Sidney, 1964. The above-mentioned production processes are also described in "Polycarbonates" in the Encyclopedia of Polymer Science and Engineering, Volume 11, Second Edition, 1988, pages 648 to 718 and in "Polycarbonate" in Becker, Braun, Kunststoff-Handbuch, Volume 3/1, Polycarbonate, Polyester, Cellululoester, Carl Hanser Verlag, Munich, Vienna, 1992, pages 117 to 299.

The melt esterification process in particular is described in: H, Schnell, "Chemistry and Physics of Polycarbonates", Polymer Reviews, Volume 9, pages 44 to 51, Interscience Publishers, New York, Sidney, 1964 and in DE 1 031 512 A, U.S. Pat. Nos. 3,022,272, 5,340,905 and U.S. Pat. No. 5,399,659.

The branched polycarbonates used according to the invention are either homopolycarbonates or copolycarbonates or mixtures of these. The polycarbonates may be partially or completely replaced by aromatic polyester carbonates.

The suitable polycarbonates according to the invention are branched in known manner, in fact preferably by the incorporation of trifunctional or more than trifunctional branching agents. Suitable branching agents are, for example, those having three or more than three phenolic groups or those having three or more than three carboxyl groups.

Examples of suitable branching agents are phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl)benzene, 1,1,1-tris(4-hydroxyphenyl)ethane, tri(4-hydroxy-phenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)phenyl)terephthalic ester, tetra(4-hydroxyphenyl)methane, tetra(4-hydroxyphenylisopropyl)phenoxy)methane and 1,4-bis((4', 4"-dihydroxytriphenyl)methyl)benzene as well as 2,4-dihydroxybenzoic acid, trimesic acid, cyanuric chloride, 3,3-bis(3-methyl-4-hydroxyphenyl)-2-oxo-2,3-dihydroindole, trimesic trichloride and α,α',α"-tris(4-hydroxyphenol)-1,3,5-triisopropylbenzene.

Preferred branching agents are 1,1,1-tris(4-hydroxyphenyl)ethane and 3,3-bis(3-methyl-4-hydroxyphenyl)-2-oxo-2,3-dihydroindole.

The quantity of optionally used branching agents is preferably from 0.05 to 1 mol. %, preferably 0.2 to 0.6 mol. %, based on mol of bisphenol used.

The average molar mass of the polycarbonates to be used according to the invention can be adjusted, for example, in known manner by an appropriate quantity of chain stoppers. The chain stoppers may be used individually or as a mixture of different chain stoppers.

Both monophenols and monocarboxylic acids are suitable chain stoppers. Suitable monophenols are, for example, phenol, p-chlorophenol, p-tert. butylphenol, cumyl phenol or 2,4,6-tribromophenol as well as long-chain alkyl phenols such as 4-(1,1,3,3-tetramethylbutyl)phenol or monoalkylphenols or dialkylphenols having a total of 8 to 20 C atoms in the alkyl substituents, such as 3,5-di-tert. butylphenol, p-tert. octylphenol, p-dodecylphenol, 2-(3,5-dimethylheptyl)phenol or 4-(3,5-dimethylheptyl)phenol. Suitable monocarboxylic acids are benzoic acid, alkylbenzoic acids and halobenzoic acids.

The quantity of chain stopper to achieve the required molecular weight range in the phase interface process is usually 2 to 4 mol. % chain stopper, based on mol bisphenol A. In the production by the transesterification process, the quantity of chain stopper is calculated by introducing the carboxylic diester, for example, diphenyl carbonate, in excess in relation to the bisphenol A, depending upon the distillation columns used, for example, 102 to 108 mol diphenyl carbonate per 100 mol bisphenol A.

Suitable UV absorbers are those compounds which, owing to their capacity to absorb at less than 400 nm, are able to effectively protect polycarbonate from UV light and which have a molecular weight of more than 370, preferably of 500, and above. UV absorbers may be present in a quantity of 0.05 to 15 wt. %, preferably 0.1 to 8 wt. %, based on the weight of the moulded sheet.

Suitable UV absorbers are in particular the compounds corresponding to formula (I), described in WO99/05205:

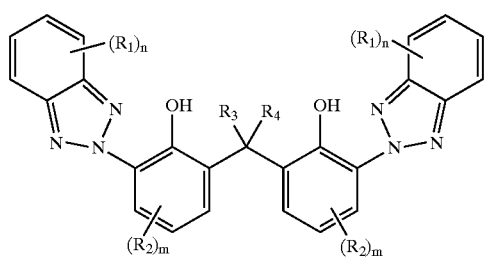

wherein
R$^1$ and R$^2$ are identical or different and denote H, halogen, C$_1$-C$_{10}$-alkyl, C$_5$-C$_{10}$-cycloalkyl, C$_7$-C$_{13}$-aralkyl, C$_6$-C$_{14}$-aryl, —OR$^5$ or —(CO)—O—R$^5$, with R$^5$=H or C$_1$-C$_4$-alkyl,
R$^3$ and R$^4$ likewise are identical or different and denote H, C$_1$-C$_4$-alkyl, C$_5$-C$_6$-cycloalkyl, benzyl or C$_6$-C$_{14}$-aryl,
m is 1,2 or 3 and
n is 1,2,3 or 4,
and those corresponding to formula (II)

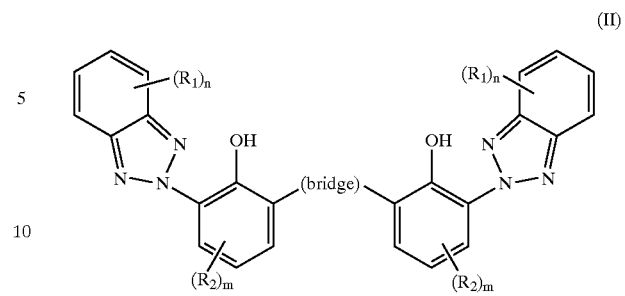

wherein the bridge denotes

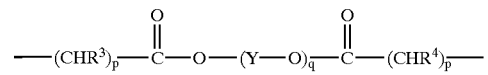

R$^1$, R$^2$, m and n have the meanings given above for formula (I),
wherein in addition
p is an integer from 0 to 3,
q is an integer from 1 to 10,
Y denotes —CH$_2$—CH$_2$—, —(CH$_2$)$_3$—, —(CH$_2$)$_4$—, —(CH$_2$)$_5$—, —(CH$_2$)$_6$—, or CH(CH$_3$)—CH$_2$— and
R$^3$ and R$^4$ have the meanings given above for formula (I).

Other suitable UV absorbers are those which are substituted triazines, such as 2,4-bis(2,4-dimethylphenyl)-6-(2-hydroxy-4-n-octyloxyphenyl)-1,3,5-triazine CYASORB® UV-1164) or 2-(4,6-diphenyl-1,3,5-triazin-2-yl)-5-(hexyl) oxyphenol (Tinuvin® 1577). A particularly preferred UV absorber is 2,2-methylenebis(4-(1,1,3,3-tetramethylbutyl)-6-(2H-benzotriazol-2-yl)phenol, which is sold commercially under the trade name Tinuvin® 360 or Adeka Stab® LA 31. Also suitable is the UV absorber Uvinul® 3030, obtained as in WO96/15102, Example 1, and corresponding to the general formula (III)

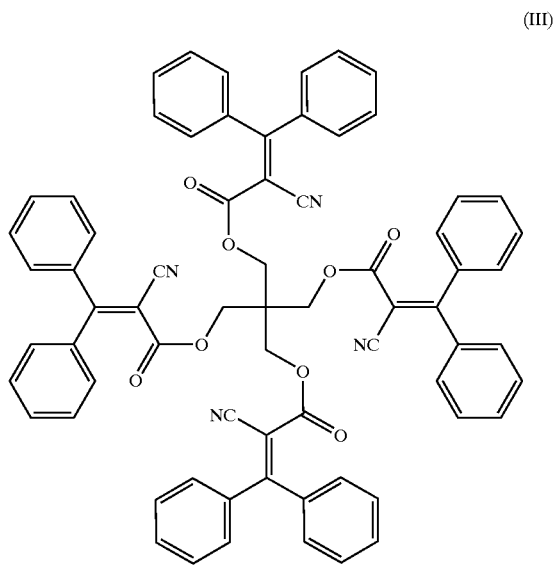

The UV absorber mentioned in EP 0 500 496 A1 is also suitable.

Suitable stabilisers for the polycarbonates are, for example, phosphines, phosphites or Si-containing stabilisers and other compounds described in EP 0 500 496 A1. Examples which may be mentioned are triphenyl phosphites, diphenylalkyl phosphites, phenyldialkyl phosphites, tris(nonylphenyl) phosphite, tetrakis(2,4-di-tert. butylphenyl)-4,4'-biphenylene diphosphonite and triaryl phosphite. Triphenylphosphine and tris(2,4-di-tert. butylphenyl) phosphite are particularly preferred.

The moulding composition to be used according to the invention may also contain monoglycerides. These are used in quantities preferably of 0.01 to 1 wt. %, particularly preferably 0.02 to 0.3 wt. %, based on the weight of the moulding composition. Monoglycerides are esters of glycerol and of saturated, aliphatic $C_{10}$ to $C_{26}$-monocarboxylic acids, preferably saturated, aliphatic $C_{14}$ to $C_{22}$-monocarboxylic acids. By monoglycerides are meant both those of the primary OH function of glycerol and those of the secondary OH function of glycerol as well as mixtures of these two isomeric classes of compounds. The monoglycerides, depending on their production, may contain less than 50% of various diesters and triesters of glycerol.

Examples of saturated, aliphatic monocarboxylic acids having 10 to 26 C atoms are decanoic acid, lauric acid, myristic acid, palmitic acid, stearic acid, eicosanoic acid, docosanoic acid, tetracosanoic acid and hexacosanoic acid. Preferred saturated, aliphatic monocarboxylic acids having 14 to 22 C atoms are, for example, myristic acid, palmitic acid, stearic acid, eicosanoic acid and docosanoic acid. Particularly preferred saturated, aliphatic monocarboxylic acids are palmitic acid and stearic acid.

The moulding composition according to the invention may also contain 0.01 to 0.5 wt. % of the (partial) esters of tetrahydric to hexahydric alcohols, in particular of pentaerythritol.

Examples of tetrahydric alcohols are pentaerythritol and mesoerythritol. Examples of pentahydric alcohols are arabitol, ribitol and xylitol. Examples of hexahydric alcohols are mannitol, glucitol (sorbitol) and dulcitol.

The esters are the monoesters, diesters, triesters, tetraesters, optionally pentaesters and hexaesters or mixtures thereof, in particular statistical mixtures, of saturated, aliphatic $C_{10}$ to $C_{26}$-monocarboxylic acids, preferably of saturated, aliphatic $C_{14}$ to $C_{22}$-monocarboxylic acids. The commercially available fatty acid esters, in particular of pentaerythritol, depending on their production may contain <60% of various partial esters.

Examples of saturated, aliphatic monocarboxylic acids having 10 to 26 C atoms are decanoic acid, lauric acid, myristic acid, palmitic acid, stearic acid, eicosanoic acid, docosanoic acid, tetracosanoic acid and hexacosanoic acid. Preferred saturated, aliphatic monocarboxylic acids having 14 to 22 C atoms are, for example, myristic acid, palmitic acid, stearic acid, eicosanoic acid and docosanoic acid.

Saturated, aliphatic monocarboxylic acids such as palmitic acid and stearic acid are particularly preferred.

The saturated, aliphatic $C_{10}$ to $C_{26}$-carboxylic acids and the fatty acid esters to be used according to the invention are as such either known in the literature or can be prepared by methods known in the literature. Examples of pentaerythritol fatty acid esters are those of the particularly preferred monocarboxylic acids mentioned above.

Esters of pentaerythritol with stearic acid and palmitic acid are particularly preferred.

It has also proved advantageous to add to the polycarbonate moulding compositions compounds corresponding to the general formula (IV)

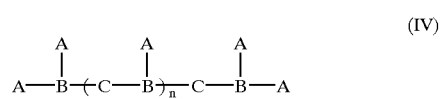

wherein A denotes a $C_{10}$ to $C_{40}$-fatty acid group, preferably $C_{22}$ to $C_{34}$-fatty acid group, B denotes a trihydric alcohol having 3 to 20, preferably 5 to 10, carbon atoms, C denotes a dicarboxyl group having 4 to 40, preferably 5 to 10, carbon atoms and n is an integer from 0 to 15. These compounds are commercially available.

They can be processed together with polycarbonates without difficulty and do not exhibit any impairment in the mouldings obtained as the product. Surprisingly, it has been found that when these compounds are used as known liquid additives to polycarbonate moulding compositions, the problems previously described no longer arise. The concentration of the compounds corresponding to formula (IV) to be used according to the invention in the polycarbonate moulding may be preferably 0.02 to 1 wt. %, in particular 0.05 to 0.6 wt. %, based on the weight of the moulding composition.

In order to modify the properties, other conventional additives can be added to the moulding compositions and/or applied to the surface. Conventional additives are, for example, fillers, reinforcing agents, stabilisers such as heat stabilisers, γ-ray stabilisers, antistatic agents, flow auxiliaries, fireproofing agents, dyes and pigments. The above-mentioned additives and others are described in G ächter, Müller, Kunststoff-Additive, Third Edition, Hanser-Verlag, Munich, Vienna, 1989.

Examples of antistatic agents are cationic compounds, for example, quaternary ammonium, phosphonium or sulfonium salts, anionic compounds, for example, alkyl sulfonates, alkyl sulfates, alkyl phosphates, carboxylates in the form of alkali metal salts or alkaline-earth metal salts, non-ionising compounds, for example, polyethylene glycol esters, polyethylene glycol ethers, fatty acid esters, ethoxylated fatty amines. Non-ionising compounds are preferred antistatic agents.

The solid mouldings according to the invention can have a thickness of 1 mm to 15 mm. They can also be thicker, depending on the field of application. The mouldings can also be laminated mouldings composed of at least two solid mouldings, for example, sheets, which have been produced by extrusion.

FIG. 1 shows a solid sheet obtained according to the invention in an oblique projection in accordance with DIN 52305.

Figure 2:
FIG. 2 shows a solid sheet obtained by extrusion by conventional processes in an oblique projection in accordance with DIN 52305.

FIG. 2 shows a solid sheet obtained by extrusion by conventional processes in an oblique projection in accordance with DIN 52305.

To produce the solid sheets by extrusion, the granular polycarbonate is fed to the hopper of an extruder and via this passed into the plasticising system, consisting of a screw and a cylinder.

The transportation and melting of the material take place in the plasticising system. The plastics melt is pressed through a slot die. A filtering device, a melting pump, stationary mixing units and other constituent parts can be arranged between the plasticising system and the slot die. The melt leaving the die reaches a glazing calender. The final forming takes place in the roll nip of the glazing calender. The setting is carried out lastly by cooling, in fact, by alternate cooling on the smoothing rolls and in the ambient atmosphere. The other devices are used for transport, for the application of protective film, and for cutting the extruded sheets into lengths and laying them down.

In the case of a coextrusion, the material to be coextruded is plasticised in the same manner in one or more further extruders. The coex melt(s) is (are) passed together with the bulk of the material to the front of the die in a special coex adaptor or in a special coex die. The coex layer can be applied either to one side or to both sides of the foundation layer. The sheets can be treated subsequently by thermoforming or hot forming, or by surface treatments such as finishing with scratch-resistant layers, water-repellent layers and layers fulfilling other functions.

The polycarbonate solid mouldings according to the invention can also be used as safety glazing, for example, in machines and in stadia, as glazing in roofs, in noise barriers and for advertising spaces. They are suitable everywhere where large areas of glazing having favourable optical properties are required.

The invention is explained in more detail by the following Example.

EXAMPLE

A linear, highly viscous polycarbonate, Makrolon® 3103, and a branched polycarbonate, Makrolon® KU-1-1243, were used for the extrusion of polycarbonate solid sheets of 6 mm in thickness and 600 mm in width.

The unit used consisted of an extruder having a screw of 75 mm in diameter (D) and a length of 33×D; the screw had a venting zone;

a melting pump;

a baffle head;

a slot die of 600 mm in width;

a three-roll glazing calender with horizontally-arranged rolls, the third roll being rotatable by ±45° to the horizontal;

a gravity-roller conveyor;

a device for application of protective film to both sides;

a haul-off device;

a device for cutting to length (saw);

a delivery table.

Both polycarbonates have a melt volume rate (MVR) of about 6 cm$^3$/10 min (300° C./1.2 kg), measured in accordance with ISO 1133. But Makrolon® KU-1-1243, owing to the lower melting viscosity in the shear rate range $\geq 100$ S$^{-1}$, in which plasticisation is carried out, is extruded at a lower melting temperature, as may be seen in Table 1 below.

From the die, the melt reaches the glazing calender, the rolls of which are at the temperature given in Table 1. The final forming and cooling of the material take place on the glazing calender. The sheet is then transported through an outlet, the protective film is applied to both sides and the sheets are then cut to length with a saw and laid down.

TABLE 1

| Comparison Variable factors in the process | | Standard Makrolon® 3103 | Invention Makrolon® KU 1-1243 |
|---|---|---|---|
| Heating zone | | | |
| 1 | Extruder Z1 | 300° C. | 270° C. |
| 2 | Extruder Z2 | 300° C. | 270° C. |
| 3 | Extruder Z3 | 270° C. | 250° C. |
| 4 | Extruder Z4 | 260° C. | 240° C. |
| 5 | Extruder Z5 | 265° C. | 240° C. |
| 6 | Extruder Z6 | 280° C. | 250° C. |
| 10 | Baffle head | 280° C. | 250° C. |
| 12 | Die/side plate | 280° C. | 270° C. |
| 13 | Die | 280° C. | 260° C. |
| 14 | Die | 280° C. | 260° C. |
| 15 | Die | 280° C. | 260° C. |
| 16 | Die/side plate | 280° C. | 270° C. |
| 17 | Die | 280° C. | 260° C. |
| 18 | Die | 280° C. | 260° C. |
| 19 | Die | 280° C. | 260° C. |
| Measured values | | | |
| | Speed of extruder | 96 min$^{-1}$ | 83 min$^{-1}$ |
| | Temperature of tube material | 304° C. | 288° C. |
| | Pressure in tube | 24 bar | 30 bar |
| | Speed Pp | 106 min$^{-1}$ | 106 min$^{-1}$ |
| | Temperature - roll 1 | 121° C. | 121° C. |
| | Temperature - roll 2 | 124° C. | 124° C. |
| | Temperature - roll 3 | 126° C. | 126° C. |
| | Speed of calender | 0.540 m/min | 0.530 m/min |
| | Throughput | 150 kg/h | 150 kg/h |
| | Width/thickness | 600 mm/6 mm | 600 mm/6 mm |

The improved optical properties of the solid sheets obtained by extrusion according to the invention are shown in Table 2.

TABLE 2

| Sheet made of | Angle of deflection $\alpha_\epsilon$ (min) DIN 52305-A-AS | Refractive index $D_\epsilon$ (min) DIN 52305-A-AZ |
|---|---|---|
| Makrolon® 3103 | 2.14 | 0.0720 |
| Makrolon® KU 1-1243 | 1.28 | 0.0210 |

Smaller values for $\alpha_\epsilon$ and $D_\epsilon$ prove the decreased optical distortion of the sheets made of Makrolon® KU 1-1243 obtained according to the invention.

FIGS. 1 and 2 provide visual proof of the effect achieved according to the invention by means of an oblique projection in accordance with DIN 52305 ($\epsilon=55°$).

What is claimed is:

1. A molded article having an angle of deflection $\alpha_\epsilon$ (min) in accordance with DIN 52305-A-AS of $\leq 2.0$ and a refractive index $D_\epsilon$ (min) in accordance with DIN 52305-A-AZ of $\leq 0.05$, comprising a molding composition which contains a branched polycarbonate having an average molecular weight $\overline{M}_w$ of 25,000 to 40,000 and a melt volume rate (MVR) of 2 to 20 cm$^3$/10 min (300° C.; 1.2 kg) in accordance with ISO 1133.

2. The molded article according to claim 1, characterised in that it contains a polycarbonate branching agent in a quantity of 0.05 to 1 mol. % based on mol of bisphenol used.

3. The molded article according to claim 1 characterised in that the angle of deflection $\alpha_\epsilon$ (min) in accordance with DIN 52305-A-AS is 1.5 and the refractive index $D_\epsilon$ (min) in accordance with DIN 52305-A-AZ is 0.03.

4. The molded article according to claim 1 characterised in that the melt volume rate (MVR) is 3 to 15 cm$^3$/10 min (300° C.; 1.2 kg) in accordance with ISO 1133.

5. The molded article according to claim 1 characterised in that it is built up from at least two polymer layers.

6. The molded article according to claim 1 characterised in that at least one functional layer is formed on at least one side of the article.

7. The molded article according to claim 6 characterised in that the functional layer is a scratch-resistant coating.

8. The molded article according to claim 1 characterised in that the functional layer is a layer providing protection against UV light and weathering.

9. Motor vehicle glazing, containing the molded article according to claim 1.

* * * * *